United States Patent [19]

Davidian

[11] Patent Number: 5,438,646
[45] Date of Patent: Aug. 1, 1995

[54] FEED-FORWARD NEURAL NETWORK

[75] Inventor: David Davidian, Cambridge, Mass.

[73] Assignee: NEC Electronics, Inc., Mountain View, Calif.

[21] Appl. No.: 932,827

[22] Filed: Aug. 19, 1992

[51] Int. Cl.⁶ ............................................. G06F 15/18
[52] U.S. Cl. ........................................ 395/26; 395/27
[58] Field of Search ...................... 395/24, 27, 22, 26; 382/14, 15

[56] References Cited

U.S. PATENT DOCUMENTS

| | | | |
|---|---|---|---|
| 4,893,234 | 1/1990 | Davidson et al. | 364/200 |
| 5,140,531 | 8/1992 | Engeler | 395/27 |
| 5,195,171 | 3/1993 | Takatori et al. | 395/24 |
| 5,204,938 | 4/1993 | Skopura et al. | 395/27 |

OTHER PUBLICATIONS

Kishi, "Application of Data-Flow Computer to Numerical Simulation", IECON '89, 15th Ann. Conf. of IEEE Indus. Elect. Soc., vol. 4, pp. 781–784, Nov. 6–10, 1989.
Quenot et al., "A Data Flow Processor for Real Time Low Level Image Processing", Euro ASIC '91, pp. 92–95, May 27–31, 1991.
Schmidt et al., "Data Driven Array Processor for Video Signal Processing", IEEE Transactions on Consumer Electronics, Aug. 1990, vol. 36, Iss. 3, pp. 327–333.
Jeffery, "The μPD7281 Processor", BYTE Magazine, Nov. 1985.
"μPD7281 Image Pipelined Processor", Jan. 1987, Data Sheet, NEC Electronics Inc.
Richard P. Lippmann, "An Introduction to Computing with Neural Nets", Apr. 1987, IEEE ASSP Magazine.
Robert Jay Brown, "An Artificial Neural Network Experiment", Apr. 1987, Dr. Dobb's Journal of Software Tools.
John J. Hopfield, David W. Tank, "Computing with Neural Circuits: A Model", Aug. 8, 1986, Science, vol. 233.
John J. Shynk, "Performance Surfaces of a Single-Layer Perception", Sep. 1990, IEEE Transactions on Neural Networks, vol. 1, No. 3.
Tom Jeffery, "The μPD7281 Processor", Nov. 1985, BYTE Magazine, New York.
"μPD7281 Image Pipelined Processor", Jan. 1987 data sheet, NEC Electronics Inc.
"μPD7281 Image Pipelined Processor", Apr. 1985, NEC Electronics Inc.
"μPD7281 Image Pipelined Processor (ImPP) Software Package User's Manual", Oct. 1986, NEC Electronics Inc.

Primary Examiner—Allen R. MacDonald
Assistant Examiner—Thomas Onka
Attorney, Agent, or Firm—Skjerven, Morrill, MacPherson, Franklin & Friel

[57] ABSTRACT

A Forward Feed Neural Network is disclosed using data flow techniques on a data flow microprocessor. As a result of this invention, a neural network is provided that has the capacity of "learning" to distinguish among patterns of data which may differ recognizably from idealized cases, and is able to perform pattern recognition faster while utilizing less memory and fewer clock cycles than neural networks implemented on sequential processors. This implementation is simpler and faster because of an inherent similarity between the flow of information in the brain and in data flow architecture.

4 Claims, 7 Drawing Sheets

FEED-FORWARD NEURAL NETWORK

BACKGROUND OF THE INVENTION

1. Field of the Invention

The present invention relates to neural networks and particularly to feed forward neural networks implemented on a data flow processor.

2. Description of the Relevant Art

The conventional computer system, formulated by John Von Neuman, consists of a central processing unit (a CPU) which sequentially operates on data and instructions held in memory. An instruction is read from memory into the CPU, decoded, then executed. Data is read from memory and operated upon. New data is generated and stored in memory. These sequences of steps are repetitiously performed in the conventional Von Neuman computer architecture. On the average, every other step involves memory access. This memory access path has been characterized as the "Von Neuman bottleneck." This condition becomes critical when there is more than one processor wanting to access the same memory at the same time. Additional hardware and software overhead is required to control and synchronize the processors.

The entire computational system of a Von Neuman-based computer is based upon a clock for sequential operation of the processor. A Von Neuman processor is a sequential machine. That is, each step in the computation has a pre-defined place in time. These processors are of a deterministic nature, as demonstrated by most all software which is executed in an in-line manner. One can trace the execution of this software (code) and the CPU is expected to process each line of code sequentially.

An alternative computer architecture called "data flow" resolves some of the inefficiencies of the conventional computer. In data flow processors, like the NEC μPD7281, program control is decentralized by allowing data to independently govern their own operations within the computer system. In a traditional CPU each step in the placing of information into and out of the CPU is centrally controlled. In a data flow processor each piece of data knows where it is going to. A transportation analogy can be made as follows: imagine every automobile in the country had to be controlled by a central sequencer, directing the flow of every car at every step of the way from start to finish. This is exactly the condition that exists in a conventional Von Neuman CPU. However, what allows so much automobile traffic to flow as smooth as it does, in general, is that each automobile knows where it is going and how to get there. The latter defines data control in a data flow architecture.

There is no predetermined sequence of instructions in a data flow machine. Data elements are independently made autonomous by associating a label or tag with the data element instructing the data element where to go and what to do when it gets there. The basic element in data flow architecture consists of the data element together with its label and is called a "token". Tokens flow along links to the functions that will operate upon them. The token waits at the function until all other tokens containing the required operands arrive. Only when a matched set of tokens is provided will the function be executed. The operation results in the generation of new tokens which independently flow to their assigned functions. In other words, data flow execution is defined by having enough information at a particular point to be processed. If not enough data is available, no execution takes place. The data flow processor will execute operations on data sets that are sufficient.

It would appear that the flow of data in a data flow machine is disorganized, but data flow software and hardware work together to keep the flow of tokens organized to prevent information traffic jams from occurring. For example, queues can serve as traffic lights to hold data tokens in transit when their destination functions are busy. A data flow program is written as a description of a graph, which is basically a map of a city of functions and interconnecting links which the tokens are to traverse during the operation of the program.

In contrast to traditional Von Neuman architectures, data flow architecture allows operations to be performed essentially in parallel. Each token moves independently of the others, and each function is evaluated independently of the others as soon as a sufficient data token set arrives. If the token is not destined for the particular processor, it just moves on. In addition, a scalar increase in performance is achieved in connecting multiple data flow processors together. This is not the case with traditional processors, which have a finite upper limit of performance in parallel.

As a result of the inherently parallel nature of a data flow machine and the autonomous nature of the token in data flow architecture, the time required for accessing memory for instructions or data is eliminated. While some tokens wait to be matched, other matched tokens are being processed, instead of waiting their turn in memory. This allows for a more efficient execution of programming instructions than in the traditional Von Neuman machine.

The propagation of tokens in a data flow program is similar to the propagation of nerve impulses in the brain. In the brain, the basic functional element is the neuron. FIG. 1A shows a simplified diagram of a basic neuron consisting of dendrites 1, soma 2, axon 3, nerve fibrils 4 and synapses 5. Nerve fibrils 4 emanating from other neurons pass impulses when their source neurons have been stimulated to fire. The dendrites 1 receive these impulses through electro-chemical gaps called synapses 5. The neuron will fire (pass an impulse through the axon 3) when the level of stimulation from the collective impulses received exceeds a certain threshold. The fired impulse propagates through the axon 3, which branches into nerve fibrils to stimulate downstream neurons.

As with neural impulses, data tokens propagate along links between functions. Only when enough data have been acquired at the queue will the function be evaluated. This corresponds to the firing of a neuron when the required level of stimulation is reached.

A formal model of a neural network was first proposed by McCulloch and Pitts in 1943 based on the above properties of biological neurons. John Hopfield formulated a working model in 1982 which was more adaptable to a computational implementation. Feedforward neural networks are characterized in that downstream outputs are not used as inputs to upstream neurons. In other words, there are no feedback loops.

A typical neuron simulation is shown in FIG. 1B. For neuron i, neural inputs $d_1$ through $d_n$ can be the output of other neurons, or can be external inputs supplied by the user. An evaluation of inputs is carried out as follows. Each input $d_j$ is multiplied by a weight $w_{ij}$. The weights correspond to the electro-chemical coupling efficiency of the synapses in the biological neuron. The weighted inputs $d_j w_{ij}$ are summed. The output is a two-valued function of this sum. If the sum is greater than the associated neural threshold $t_i$, then a predetermined value is output for $D_i$. Otherwise, a different predetermined value is output, usually zero.

SUMMARY OF THE INVENTION

The present invention pertains to a neural network simulation implementation using data-flow processors. This data-flow neural network utilizes the inherent similarity of data-flow functionality and the operation of a neuron. Input data represent nerve impulses. The data move along links representing neuron dendrites to be collected at a queue function representing the input of nerve impulses at the cyton, or body of the neuron. In the neuron body, the simultaneous collective effect of the input nerve impulses determine the output of the neuron. This is achieved in the present invention by simultaneously summing weighted neural data inputs in parallel. Data-flow allows this process to occur at the earliest possible moment, that is, when sufficient data has arrived to perform the summation. Since there is no central processing entity as in the Von Neuman and conventional parallel processing architectures, the neural impulses do not need to be written or fetched from memory, thus enabling a faster implementation. As in nature, neural impulses flow independently along neural paths to a cyton, and the chemical firing of a neuron occurs independently of other neurons. This data-flow neural network implementation more closely simulates natural brain activity than the prior art techniques of using Von Neuman or parallel architectures with the advantage of faster processing with a minimal memory requirement.

DETAILED DESCRIPTION

This technique, that is, of performing neural network simulations on a Data Flow Processor, allows one to overcome most of the problems associated with the implementation of this algorithm on a conventional microprocessor. This implementation is the first of its kind on microprocessor-based hardware.

Data flow by definition only performs operations on data when there is enough data to operate on, and will do nothing until the required data is present. This basic definition of data flow was used to simulate a method of neural simulation. A biological neuron does nothing until stimulated. Similarly a neural simulation "should" do nothing until it receives its equivalent of stimulation, i.e., data.

This generic similarity between the basic operation of a neuron and of data flow is exploited in this invention. The problem of temporarily storing, tagging, and retrieving data values to input into the mathematical representation is eliminated in the μPD7281 data flow processor with this feed forward neural network simulation.

In general, a digital implementation of a feed forward neural network requires that an element of input data be copied and made available to each respective "neural accumulator". In the course of this process, these copies are weighted by a respective non-linear "weighting factor". This process may involve nothing more than a simple multiplication of these data copies by a respective weight.

These weighted data inputs are then collected and summed. This summed value of weighted data elements are then compared against a pre-set threshold setting. If the sum of weighted data elements are greater than this threshold then the simulated neuron is said to have "fired". If the sum of the weighted data elements are less than this threshold value then the neuron has not "fired". It is up to the application to determine the results of these "fired" neurons.

This describes a feed-forward neural network, where both the weights and threshold settings have somehow been determined before hand. In an actual system there is a trial and error method for determining these values. This method is known as back-propagation. The method of back-propagation involves setting seed values for both the weights and threshold values and by using prediction and correction techniques, the weights and thresholds are then adjusted until the desired neural activity results.

Figure 1A:
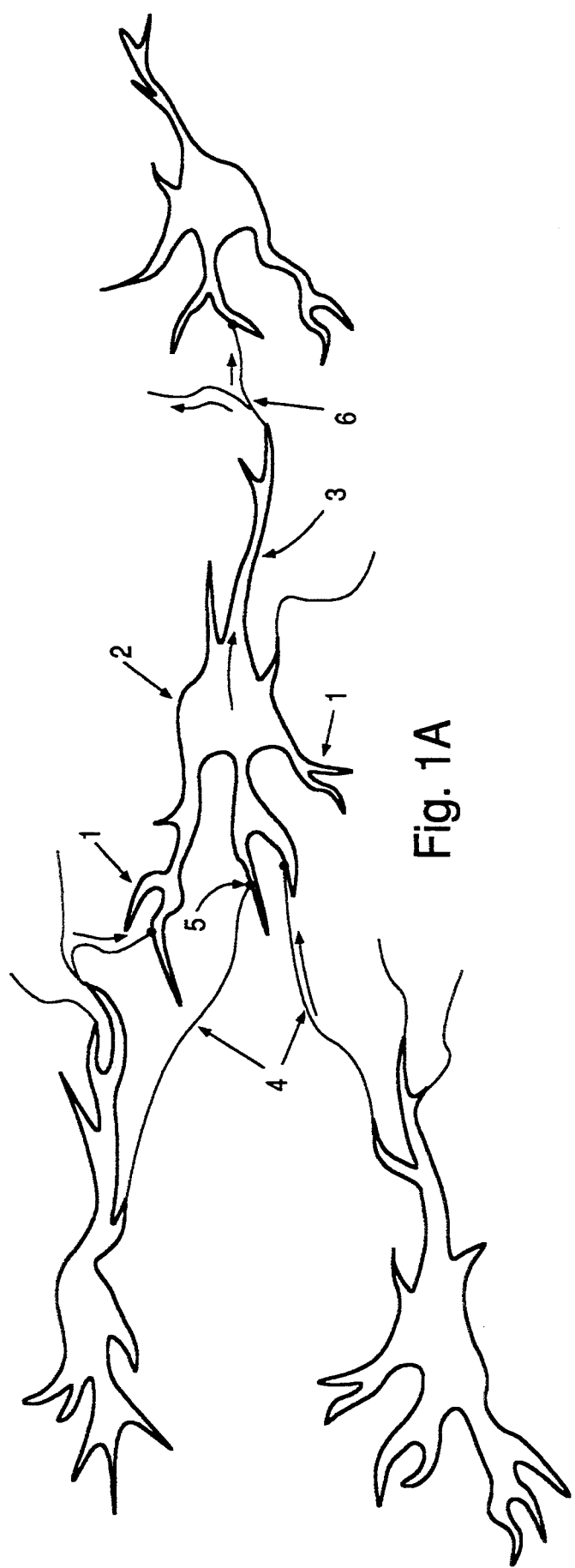
FIG. 1A is an illustration showing the operation of a biological neuron.
Figure 1B:
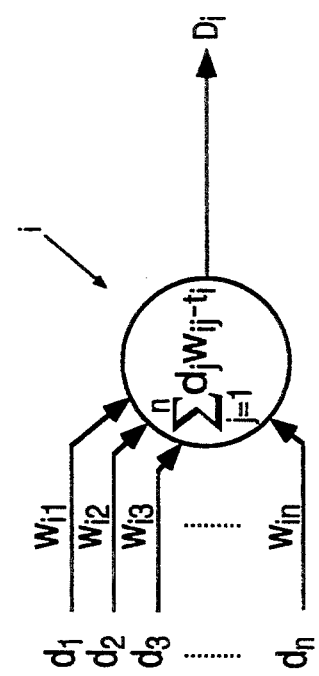
FIG. 1B is a diagram of a neuron simulation used in an embodiment of the neural network simulation.
Figure 2:
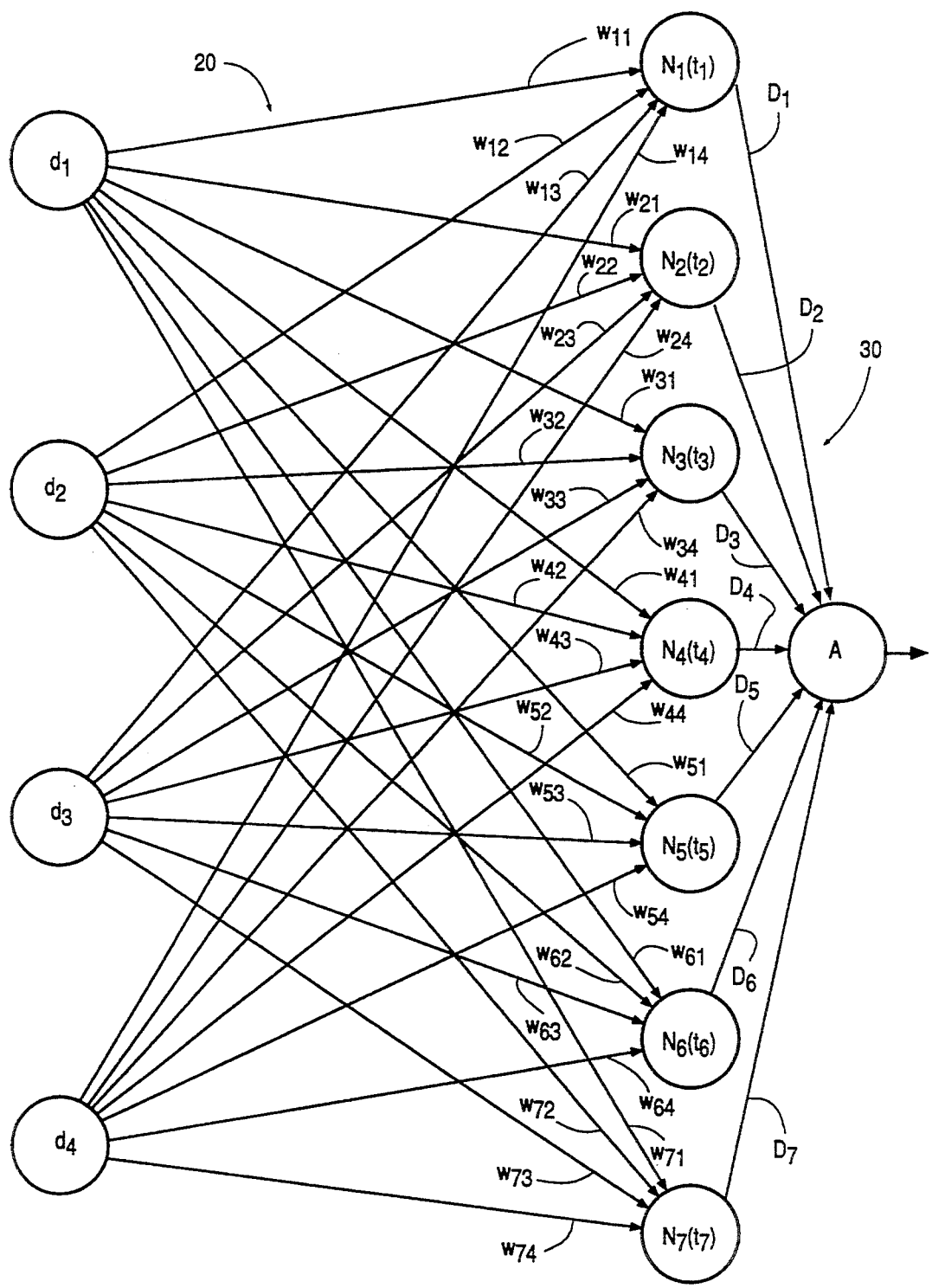
FIG. 2 is a diagram of a neural network simulation in an embodiment of the present invention.
Figure 3A:
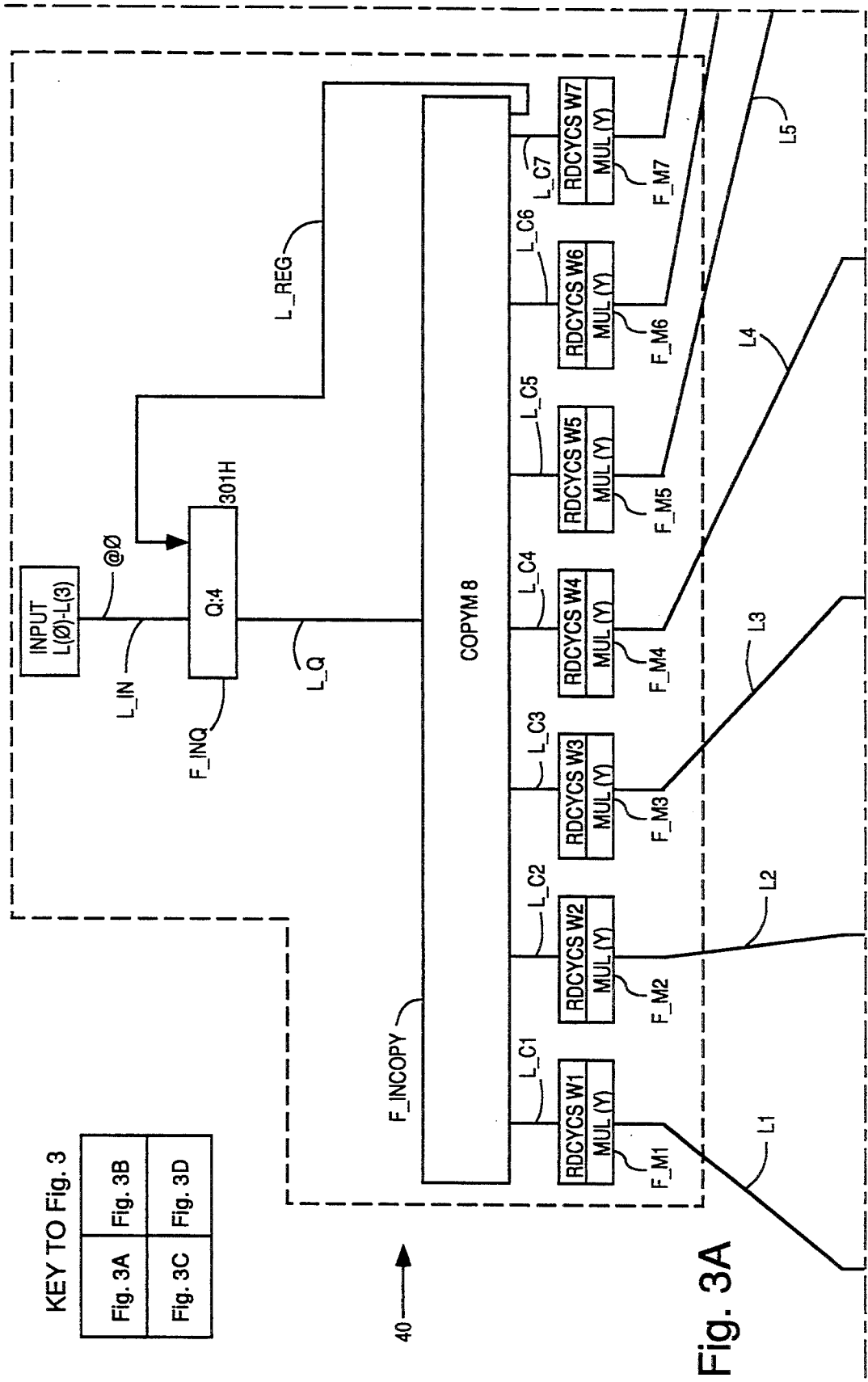
FIGS. 3A–3D together are a data flow graph describing an embodiment of a neural network simulation on a μPD7281 processor.

One embodiment of this particular neural network utilizes seven neurons $N_1(t_1)$ through $N_7(t_7)$ as is shown in FIG. 2, each of which is generally denoted by $N_i(t_i)$ in FIG. 1B. The input data $d_1$ to $d_4$, as indexed with subscript j in FIG. 1B, are directed along input links 20 to each of the neurons. Associated with each neuron is a number called a threshold, $t_i$. Associated with each input link is a number $w_{ij}$ which is the weight. Data inputs $d_j$ along each particular link are multiplied by the respective input link weight $w_{ij}$. Each neuron $N_i$ receives the same data set $d_1$ through $d_4$ however, the neuron weights are, in general, different for each of the input links 20. Thus the input for each neuron $N_1(t_1)$ is the four weighted products $d_j w_{ij}$. The neuron $N_1(t_1)$ takes the four weighted products $d_j w_{ij}$ and sums them. If this sum is greater than the threshold value $t_i$ assigned to that particular neuron, then that neuron will output (fire) a predetermined non-zero value $D_i$ along an output link 30. If the sum is less than or equal to the threshold, a zero output (neuron will not fire) results, $D_i = 0$. The output values flow along output links 30 to be collected and accumulated at A.

The weights $w_{ij}$ and thresholds $t_i$ are determined so as to provide a particular output for a whole range of input data values. These ranges may correspond to optical patterns, for example, so that data from optically similar patterns yield an identical output. Thus, in formulating these weights and thresholds, the neural network is trained to recognize variations of a particular pattern. The outputs $D_i$ of FIG. 2 then determine whether or not the input data corresponds to the particular idealized pattern represented by the set of weights and threshold values of the network.

There are several standard algorithms for determining weights and thresholds. In general, data from an ideal pattern, and the usage is not necessarily restricted to optical patterns, to be used as a comparison is input and the weights and threshold are manipulated to provide a particular output. Then the data from recognizably similar patterns are input and the resulting output is compared to the ideal case. An optimizing algorithm is utilized to manipulate the weights and thresholds until data from similar patterns result in the same output as the ideal case.

Data flow programs are represented by flow charts called data flow graphs which are very similar to logic diagrams. Instead of logic elements, however, the individual modules represent data flow programming commands or functions. From this representation, the program is easily coded. A computer program listing to implement the present embodiment is provided as part of this specification. This embodiment is implemented on one µPD7281 processor. More complex neural network simulations in accordance with the present invention may require interconnecting several µPD7281 processors.

The input values $d_j$ are a set of numbers obtained by some method of pattern characterization. The patterns to be characterized may be image data or sets of numerical data. The characterization method for providing the input data $d_j$ depend on the aspect of interest in the patterns to be recognized. These values are usually input to the data flow processor from a host CPU.

In accordance with the invention, FIGS. 3A through 3D are the data flow graph for the simulation of the above described neural network utilizing one µPD7281 processor. Unless otherwise specified, functions are denoted by symbols beginning with the letter "F" and links between the functions are denoted by symbols beginning with the letter "L". Note that the data flow graph appears to contain three main sections. The top section 40 is where input data tokens enter along input link L_IN. Four tokens containing the data elements $d_1$ to $d_4$ are input from the host processor sequentially along link L_IN as L(0)-L(3). The function F_INQ is a queue which collects the input data tokens. A queue waits for the arrival of all necessary tokens (a matched set) before passing them to the functions which will operate on them.

This queue requires a token from link L_IN and a token from the L_REG link before passing the input data token from L_IN to the next function along link L_Q. Unless otherwise specified, queues pass tokens from their left input link when their input tokens are matched.

The 301H designation for the queue at function F_INQ is a queue option which allows the first input data token to proceed unmatched. For subsequent input data tokens, the matching token along L_REG comes from the COPYM 8 operation, which has made 8 copies of the previous input data token. The output along L_REG is the 8th copy of the previous input data token. The first input data token will not have had a data token to precede it, therefore, the queue must be pre-empted to allow the first input data token to proceed.

The token from link L_REG is the 8th copy of the input data token for F_INCOPY from link L_Q. The purpose of this token is to prevent premature arrival of tokens along L_Q before the COPYM 8 operation is completed with the previous input data token.

After being matched up or passed by pre-empting at F_INQ, each data token is passed along link L_Q to the function F_INCOPY where eight copies of the data token are made. These copies flow along the links L_C1 to L_C7. Each weighting function F_M1 through F_M7 receives a copy of the each input data token.

These weighting functions F_M1 through F_M7 match each copy of the data elements $d_j$ with assigned function weights $w_{ij}$ read from memory and form the weighted products $d_j w_{ij}$. For example, when a copy of a data token containing $d_2$ arrives at F_M1 along link L_C1, a read of a second element $w_{12}$ of the array W1 occurs at the RDCYCS W1 operation of F_M1. The variable W1 is a four element array containing the weight values $w_{11}$, $w_{12}$, $w_{13}$ and $w_{14}$. Each copy of the data token arriving at weighting function F_M1 causes a subsequent array element to be read. The token containing data element $d_1$ had previously caused the reading of the $w_{11}$ array element of W1. The data value $d_2$ is multiplied with the array element corresponding to the input link weight $w_{12}$ to form the weighted product $d_1 w_{12}$. This occurs at the MUL(Y) operation of function F_M1. A token containing this weighted product flows out of weighting function F_M1 along the link L1. Thus, weighting function F_M1 forms the weighted products $d_1 w_{11}$, $d_2 w_{12}$, $d_3 w_{13}$, and $d_4 w_{14}$. The other weighting functions form their respective weighted products in the same manner.

Figure 5:
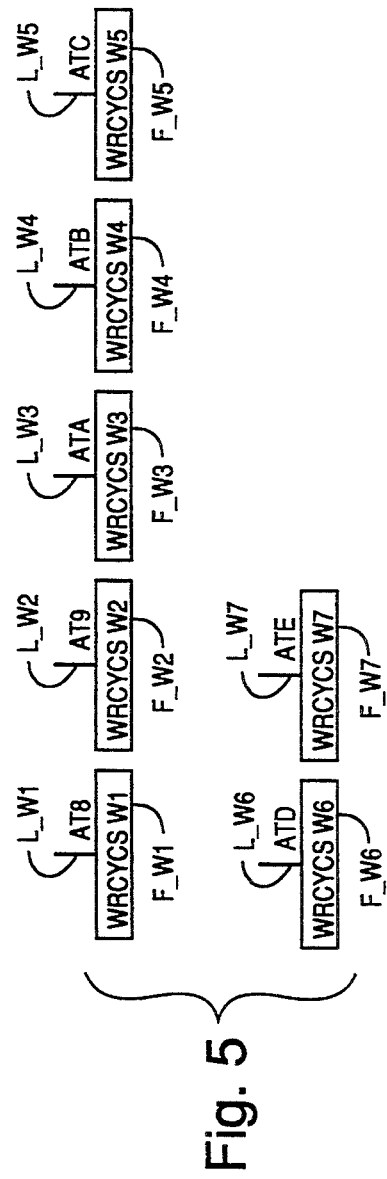
FIG. 5 is a data flow graph showing the assignment of weight values used in an embodiment of a neural network simulation on a μPD7281 processor.

The weight assignments are shown in FIG. 5. These values W1 through W7 are stored as 4 element arrays by the functions F_W1 through F_W7 respectively in the storage locations designated by AT8 through ATE before processing the data tokens.

Figure 3B:
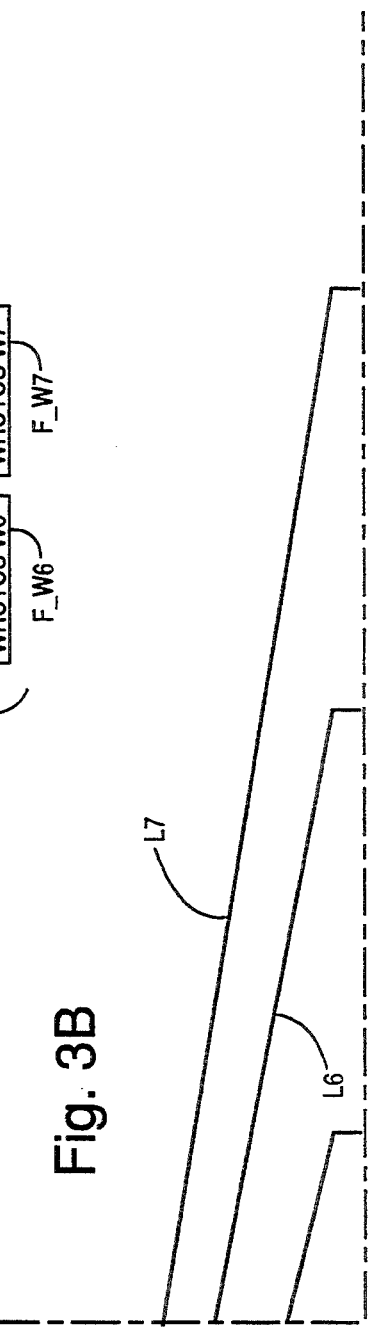
Figure 3C:
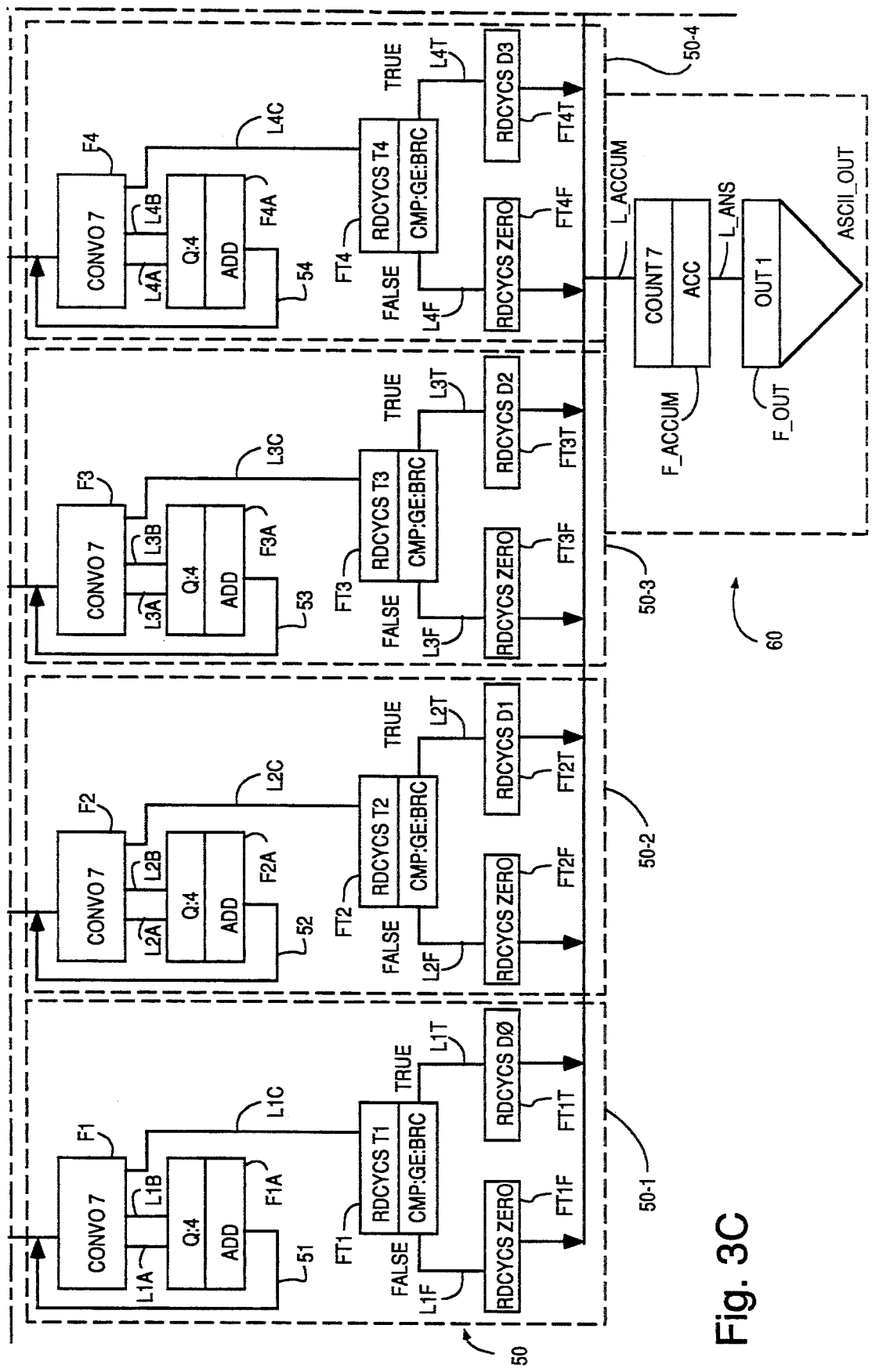
Figure 3D:
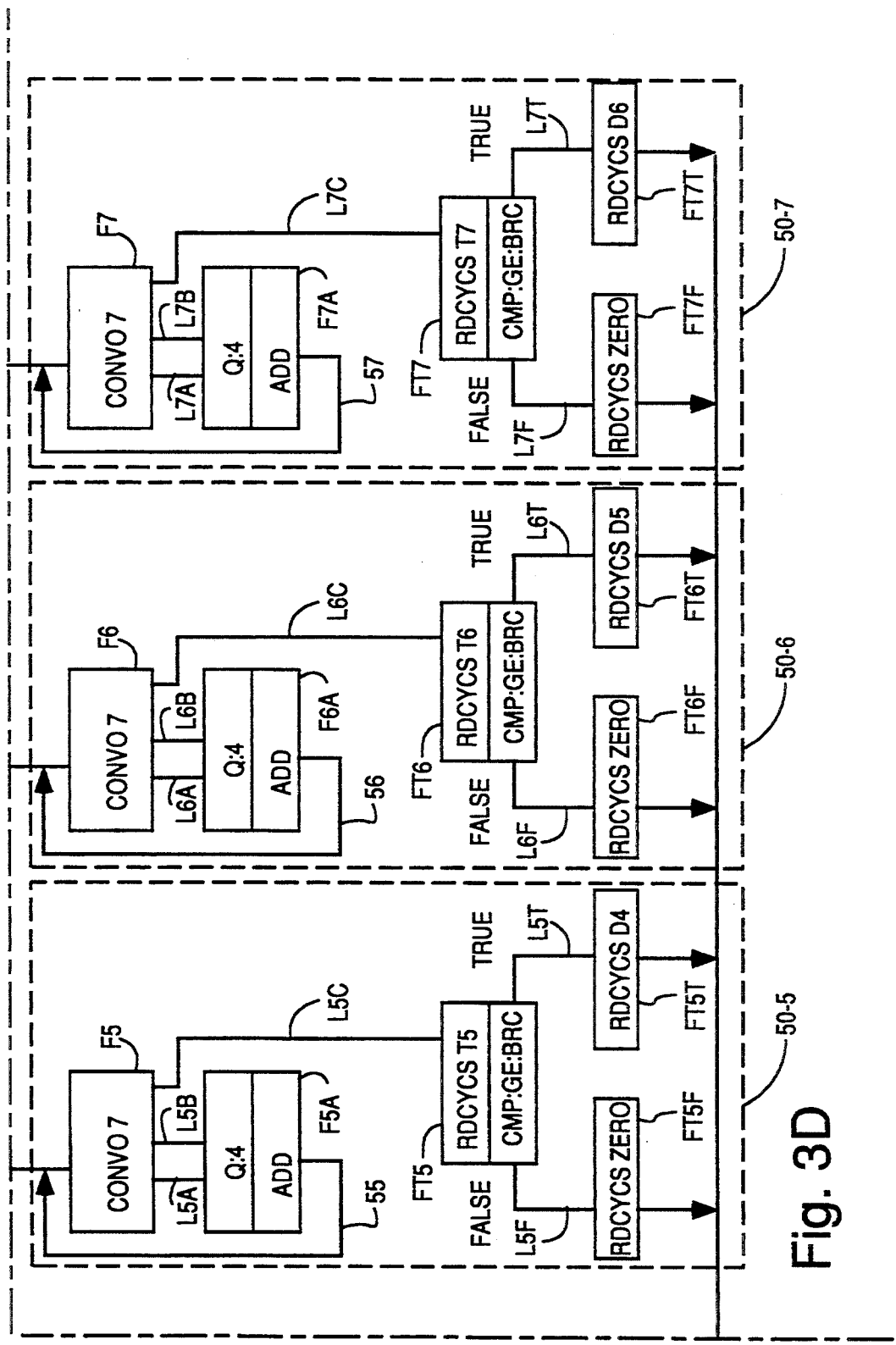

The weighted products $d_j w_{ij}$ formed at weighting functions F_M1 through F_M7 flow along links L1 to L7 to be received at the neural summers 50-1 to 50-7 (FIG. 3C). Each neuron summer receives the weighted input data from its respective weighting function.

The neural summing process takes place in the middle layer 50 of the data flow graph at functions F1 to F7 and F1A to F7A. The CONVO 7 function (F1-F7) matches partial sums coming from links 51-57 with incoming weighted products until a complete neural sum $\Sigma d_j w_{ij}$ is formed for each neural summer 50-1 through 50-7. This process is described with respect to neural summer 50-1. All other neural summers operate in the same manner.

When the first weighted product $d_1 w_{11}$ arrives at neural summer 50-1, it is received at the CONVO 7 operation of function F1 and passed through link L1A to the function F1A where it waits at the queue for the second weighted product. At this point the CONVO 7 function has registered the passage of one token. The second weighted value $d_2 w_{12}$ arrives at the queue at F1A through link L1B, with the CONVO 7 function registering the passage of a second value. The matched set of the weighted products $d_1 w_{11}$ and $d_2 w_{12}$ then proceed to be added together at the ADD function of function F1A, thus forming a first partial sum $d_1 w_{11} + d_2 w_{12}$. This first partial sum is input back into the CONVO 7 function through link 51 to be registered along with the next weighted product $d_3 w_{13}$. The CONVO 7 function has now registered the passage of 4 values (the three weighted products and the first partial sum). The first partial sum and the recent weighted product $d_3w_{13}$ are then input into the queue of function F1A through links L1A and L1B. They are added as before to form the second partial sum $d_1w_{11}+d_2w_{12}+d_3w_{13}$. Again as before, this partial sum is input back into the CONVO 7 function along with the last weighted product $d_4w_{14}$. CONVO 7 has now registered the passage of 6 values. The weighted product $d_4w_{14}$ and the second partial sum proceed as before to be matched at the queue and added together, thus forming the last partial sum $d_1w_{11}+d_2w_{12}+d_3w_{13}+d_4w_{14}$. This last partial sum is the full neural sum which comes back to the CONVO 7 as the seventh registered value, indicating the completion of the summing process. As the seventh registered value this neural sum will be output by CONVO 7 along link LC1 to the function FT1.

The above described summation process occurs independently and simultaneously in all the neural summers 50-1 though 50-7. The summed values then appear along links L1C to L7C, get matched with their respective threshold cutoffs $t_i$ in accordance with the threshold assignment scheme of FIG. 4. These threshold values T1 through T7 are stored by the functions F_T1 through F_T7 respectively in the storage locations designated by AT1 through AT7 before processing the input data.

The neural sums output along the links L1C to L7C are interpreted in functions FT1 to FT7. In the neural summer 50-1, the neural sum $d_1w_{11}+d_2w_{12}+d_3w_{13}+d_4w_{14}$ is received from link L1C by the function FT1 causing a read of the predetermined assigned threshold value $t_1$ from storage by the RDCYCS T1 operation. The threshold value $t_1$ and the neural sum $d_1w_{11}+d_2w_{12}+d_3w_{13}+d_4w_{14}$ are compared at the COMP:GE:BRC operation of function FT1. If a greater than or equal to condition exists (i.e. $d_1w_{11}+d_2w_{12}+d_3w_{13}+d_4w_{14}\geq t_1$) then a read of a predetermined non-zero 8-bit value D0 occurs (neuron fires) at the RDCYCS D0 operation of function FT1T to be output along link L_ACCUM. In the present invention, D0 is binary 00000001. D1 is binary 00000010. The other non-zero output values are respectively bit shifted. If the compare condition results in a less than (i.e. $d_1w_{11}+d_2w_{12}+d_3w_{13}+d_4w_{14}<t_1$), a read of a zero occurs (neuron doesn't fire) at the RDCYCS ZERO operation of FT1F which is output along link L_ACCUM. In formulating the comparison output values as described, a unique value is assigned to each possible combination of neuron states.

The above described threshold comparison process occurs independently and simultaneously in all the neural summers 50-1 through 50-7. The comparison output values accumulate along data link L_ACCUM and get summed at function F_ACCUM. The result of this operation appears as a single value to be output to the host at function F_OUT along link ASCII_OUT.

Figure 6:
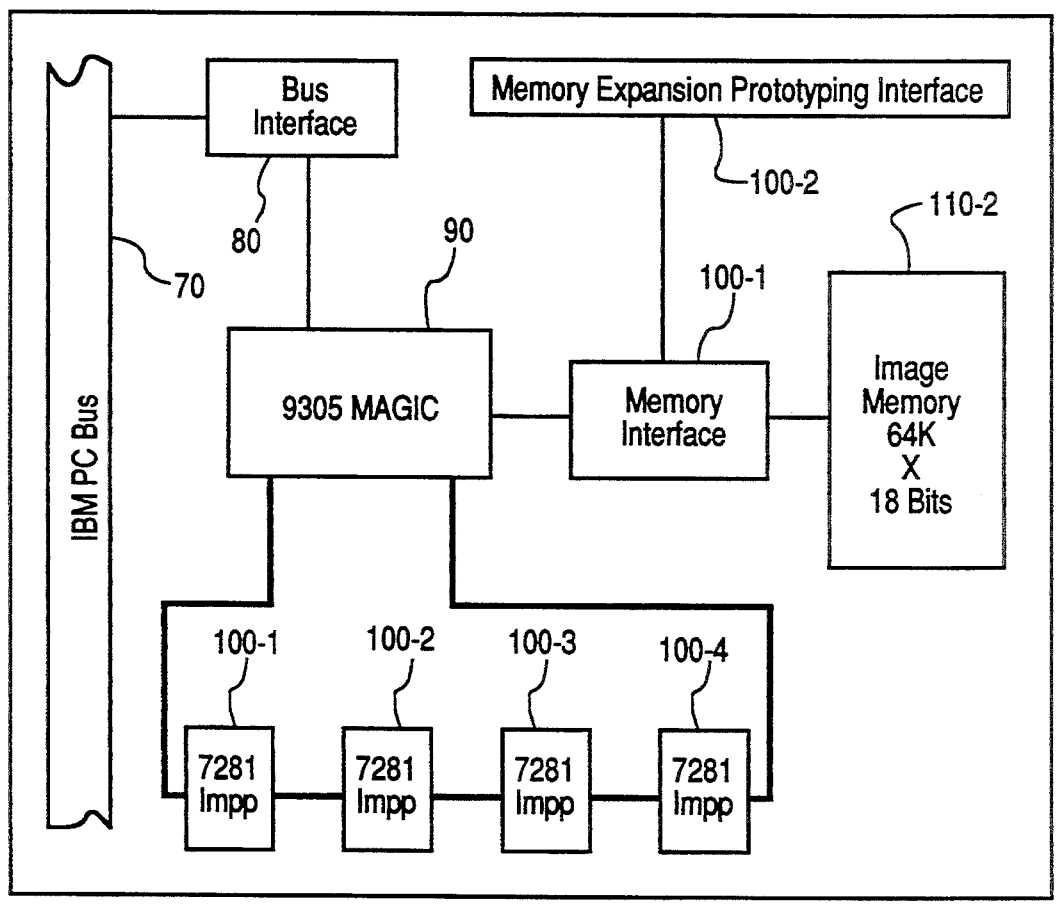
FIG. 6 is a block diagram of the DF-1 circuit board on which an embodiment of the neural network simulation is implemented.

A typical system configuration for the implementation of the present embodiment is shown in the block diagram of FIG. 6. FIG. 6 shows the DF-1 Board block diagram. The DF-1 board provides peripheral data flow processors which work in parallel with the host CPU of an IBM PC or compatible. There are four interconnected $\mu$PD7281 data flow processor 100-1 through 100-4, each of which has a designated module number 8 through B respectively, in hexadecimal numbers. The present embodiment of the data flow neural network described above can be implemented on any one of these four data flow processors, thus leaving the other three for auxiliary data flow processing related to specific applications such as image processing. Data can be input directly from the host CPU or from one or more of the three remaining $\mu$PD7281 data flow processors.

Figure 4:
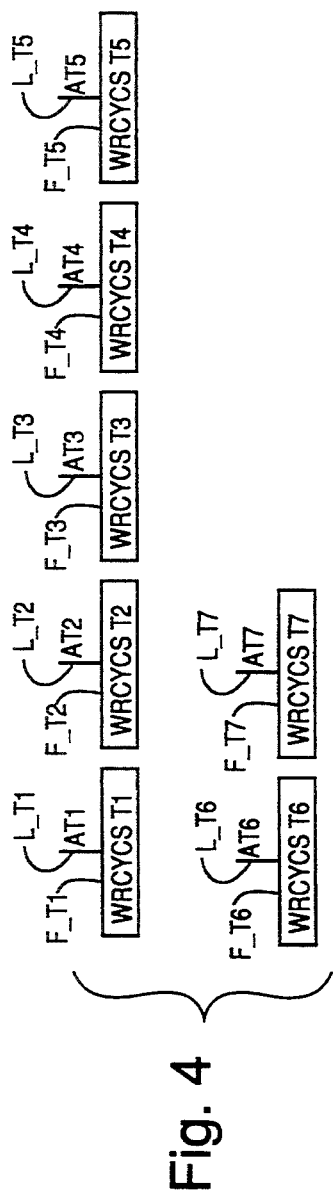
FIG. 4 is a data flow graph showing the assignment of threshold values used in an embodiment of a neural network simulation on a μPD7281 processor.

From the data flow graphs of FIGS. 3, 4 and 5, the program provided as an appendix along with any application specific programs are input as a text file on the host computer. An assembler on the host computer then assembles this file into a hex file consisting of a list of tokens. This file may also contain run time tokens to execute as soon as the program is loaded. The program is loaded through the host data bus 70 into the standard IBM PC bus interface 80 of the DF-1 board and then proceeds to the 9305 Memory Access and General Interface Chip (MAGIC) 90, which provides read/write memory and passes tokens to their destined data flow processors 100-1 through 100-4. The 9305 chip is also a module which processes designated tokens for performing supplemental I/O duties. The tokens in the token list independently find their way to their destinations processors and perform their assigned specific duties according to their tags to load the functions and links shown in the data flow graph of FIGS. 3A, 3B, 3C, 3D, 4 and 5. After the various functions and links have been loaded, the neural net is ready to "learn".

The DF-1 board also provides extra memory in the Image Memory chip 110-2, and memory expansion support 110-3 via the Memory Interface 110-1.

Back-propagation is one of many standard techniques for "teaching" neural networks. The basic process involves presenting a set of input patterns to the given neural network and iteratively adjusting the weights $w_{ij}$ until a target output is achieved for each input pattern presented. When all input patterns illicit correct responses (within a tolerable error), the neural network is said to have learned these patterns.

To begin the Back-propagation training algorithm, the weights $w_{ij}$ are initialized to small random values. The thresholds $t_i$ are held constant during the algorithm. They are usually set near the middle of the range of possible values for the neural sum $\Sigma d_j w_{ij}$. In the present embodiment, the minimum neural sum is 0 and the maximum neural sum is the largest 16-bit number 65,535. A natural choice for each threshold $t_i$ would then be 65,535/2=32,768 or 8000H. They may be later modified if the algorithm does not converge.

A pattern is presented to the neural network in the form of four sixteen bit numbers $d_1$ through $d_4$ characterizing the pattern to be recognized. In accordance with the operation of the neural net, an integer value A between 0 and 127 is output depending on the contribution of each neuron. Each neuron i contributes a value $a_i$ to the network output, which is either $2^i$ or 0, depending on the weight settings and the neuron input. A target value D must be a value selected from 0 through 127 in the present embodiment.

The target value has binary constituents $D=2^6\times b_6+2^5\times b_5+2^4\times b_4+2^3\times b_3+2^2\times b_2+2^1\times b_1+2^0\times b_0$ where $b_6b_5b_4b_3b_2b_1b_0$ is the binary representation of target value D. Corresponding constituents of the target value $2^1\times b_i$ and the contribution $a_i$ of neuron i to output A are subtracted to give a neuron error $d_1=2^i\times b_i-2^i$. A weight correction for the inputs of each neuron i is calculated: $\Delta w_{ij}=hd_id_j$. The factor h is a user adjustable learning rate to regulate the convergence of the network learning process and is generally set to values between 0.25 and 0.75. Factor $d_1$ is the neuron contribution error of neuron i and $d_j$ is the input data value for the jth input link of neuron i.

The weight correction $\Delta w_{ij} = hd_id_j$ is computed for all inputs j to all neurons i and the correction is effected by setting the new weights $w_{ij} = w_{ij} + \Delta w_{ij}$.

With these new weights, the same pattern is again presented to the network. If the outputs are within a predetermined error of the target value, the learning process is terminated. Otherwise, new weights are assigned iteratively in accordance with the procedure described above until a minimal error is incurred. In practice, a root mean squared value of less than 0.1 indicates an effective training.

In the event that the learning algorithm does not converge to within a specified error, the learning rate h can be manipulated or the weights reinitialized to different initial values to place the iterations on to a convergent sequence.

If the network is to learn to recognize a set of distinct patterns (e.g. characters in the alphabet), the learning algorithm is run for each pattern and weights adjusted accordingly to elicit distinct corresponding outputs for each pattern. Since weights are changed for each pattern, the set as a whole must be repeatedly run through the learning algorithm until each pattern generates the correct output to within the desired accuracy without having to further change the weights. At the conclusion of the back-propagation learning algorithm, one set of weights is determined, enabling the network to recognize all patterns in the set.

The data flow neural network, having been thus trained, is now ready for utilization in pattern recognition. The weights determined are saved to be loaded each time the associated training patterns are to be recognized. The learning algorithm need only be run once.

When the trained data flow neural network is presented with a pattern sufficiently similar to one of the training patterns, the output of the network will be the same as the trained pattern output, thus indicating recognition.

A Forward Feed Neural Network is therefore implemented using data flow techniques on NEC $\mu$PD7281 data flow processors. As a result of this invention, a neural network is provided that has the capacity of "learning" to distinguish among patterns of data inputs which may differ recognizably from idealized cases, and is able to perform pattern recognition faster while utilizing less memory and fewer clock cycles than neural networks implemented on sequential processors. This implementation is simpler and faster because of an inherent similarity in the flow of information in the brain and in data flow architecture.

```
** UPD7281 ASSEMBLER, V1.0 **    PROGRAM NAME

SOURCE FILE ; C:NEURAL.NET

OBJECT FILE ; C:NEURAL.LNK

LIST FILE   ; C:NEURAL.PRN

ERROR FILE  ;

COMMAND     ; NEURAL.NET

LNO    STNO        SOURCE 1      1       /*   A SOURCE PROGRAM FOR THE NEC uPD7551 Data Flow ImPP.    */
     2      2
     3      3       /*   PROGRAM NAME: NEURAL.NET
     4
     5                   THE FOLLOWING IS THE FLOW GRAPH FOR AN ImPP PROGRAM
     6                   THAT CALCULATES SIMULATES A 4 INPUT - 7 NEURON - 1 OUTPUT
     7                   NEARAL NETWORK
     8
     9              */
    10      4
    11      5       ;------------------------------------------------------------
    12      6
    13      7       LITERAL  FTN = 'FUNCTION';
    14      8       LITERAL  LNK = 'LINK';
    15      9       LITERAL  MEM = 'MEMORY';
    16     10
    17     11       EQUATE    HOSTMN = 0              ;MODULE NUMBER OF HOST
    18     12       EQUATE    HOSTID = 0              ;ID CHOSEN TO TAG ON TO
    19     13                                         ;OUTPUT TOKEN D
    20     14
    21     15       MODULE    PGMMN  = 0BH            ;MODULE NUMBER OF ImPP
    22     16                                         ;THAT WILL EXECUTE THIS PROGRAM
    23     17
    24     18       LOCATE    DM(64,511)              ;FORCES ANY DM IN POSSIBLE CONFLICT
    25     19                                         ;WITH GE INSTR. OUT OF THE WAY
    26     20
    27     21       ;------------------------------------------------------------
    28     22
    29     23       ;         WEIGHTS AND THRESHOLD SETTING AREA
    30     24
    31     25       INPUT                             L_T1 AT 1;
    32     26       LNK                             = F_T1(L_T1);
    33     27       FTN            F_T1             = WRCYCS(T1,1);
    34     28       MEM            T1               = AREA(1);
    35     29
```

```
36   30   INPUT                               L_T2 AT 2;
37   31   LNK                                 = F_T2(L_T2);
38   32   FTN         F_T2                    = WRCYCS(T2,1);
39   33   MEM         T2                      = AREA(1);
40   34
41   35   INPUT                               L_T3 AT 3;
42   36   LNK                                 = F_T3(L_T3);
43   37   FTN         F_T3                    = WRCYCS(T3,1);
44   38   MEM         T3                      = AREA(1);
45   39
46   40   INPUT                               L_T4 AT 4;
47   41   LNK                                 = F_T4(L_T4);
48   42   FTN         F_T4                    = WRCYCS(T4,1);
49   43   MEM         T4                      = AREA(1);
50   44
51   45   INPUT                               L_T5 AT 5;
52   46   LNK                                 = F_T5(L_T5);
53   47   FTN         F_T5                    = WRCYCS(T5,1);
54   48   MEM         T5                      = AREA(1);
55   49
56   50   INPUT                               L_T6 AT 6;
57   51   LNK                                 = F_T6(L_T6);
58   52   FTN         F_T6                    = WRCYCS(T6,1);
59   53   MEM         T6                      = AREA(1);
60   54
61   55   INPUT                               L_T7 AT 7;
62   56   LNK                                 = F_T7(L_T7);
63   57   FTN         F_T7                    = WRCYCS(T7,1);
64   58   MEM         T7                      = AREA(1);
65   59
66   60
67   61   INPUT                               L_W1 AT 8;
68   62   LNK                                 = F_W1(L_W1);
69   63   FTN         F_W1                    = WRCYCS(W1,4);
70   64   MEM         W1                      = AREA(4);
71   65
72   66   INPUT                               L_W2 AT 9;
73   67   LNK                                 = F_W2(L_W2);
74   68   FTN         F_W2                    = WRCYCS(W2,4);
75   69   MEM         W2                      = AREA(4);
76   70
77   71   INPUT                               L_W3 AT 10;
78   72   LNK                                 = F_W3(L_W3);
79   73   FTN         F_W3                    = WRCYCS(W3,4);
80   74   MEM         W3                      = AREA(4);
81   75
82   76   INPUT                               L_W4 AT 11;
83   77   LNK                                 = F_W4(L_W4);
84   78   FTN         F_W4                    = WRCYCS(W4,4);
85   79   MEM         W4                      = AREA(4);
86   80
87   81   INPUT                               L_W5 AT 12;
88   82   LNK                                 = F_W5(L_W5);
89   83   FTN         F_W5                    = WRCYCS(W5,4);
90   84   MEM         W5                      = AREA(4);
91   85
92   86   INPUT                               L_W6 AT 13;
93   87   LNK                                 = F_W6(L_W6);
94   88   FTN         F_W6                    = WRCYCS(W6,4);
95   89   MEM         W6                      = AREA(4);
96   90
97   91   INPUT                               L_W7 AT 14;
98   92   LNK                                 = F_W7(L_W7);
99   93   FTN         F_W7                    = WRCYCS(W7,4);
100  94   MEM         W7                      = AREA(4);
101  95
102  96
103  97   ;------------------------------------------------------------------
104  98
105  99   INPUT                               L_IN AT 0;
106  100  LNK         L_Q                     = F_INQ(L_IN,L_REG);
107  101  FTN         F_INQ                   = QUEUE(Q_IN,4),301H;
108  102  MEM         Q_IN                    = AREA(4);
109  103
110  104  LNK         L_C1,L_C2,L_C3,L_C4,L_C5,L_C6,L_C7,L_REG = F_INCOPY(L_Q);
111  105  FTN         F_INCOPY                                 = COPYM(8,0);
112  106
113  107  LNK         L1                      = F_M1(L_C1);
114  108  FTN         F_M1                    = RDCYCS(W1,4),MUL(Y);
115  109
116  110  LNK         L2                      = F_M2(L_C2);
117  111  FTN         F_M2                    = RDCYCS(W2,4),MUL(Y);
118  112
119  113  LNK         L3                      = F_M3(L_C3);
120  114  FTN         F_M3                    = RDCYCS(W3,4),MUL(Y);
121  115
122  116  LNK         L4                      = F_M4(L_C4);
123  117  FTN         F_M4                    = RDCYCS(W4,4),MUL(Y);
```

```
124  118
125  119   LNK        L5                = F_M5(L_C5);
126  120   FTN        F_M5              = RDCYCS(W5,4),MUL(Y);
127  121
128  122   LNK        L6                = F_M6(L_C6);
129  123   FTN        F_M6              = RDCYCS(W6,4),MUL(Y);
130  124
131  125   LNK        L7                = F_M7(L_C7);
132  126   FTN        F_M7              = RDCYCS(W7,4),MUL(Y);
133  127
134  128
135  129   ;          THE FOLLOWING ARE THE CONVOS AND ADDS
136  130
137  131   LNK        L1A,L1B,L1C       = F1(L1);
138  132   FTN        F1                = CONVO(7);
139  133
140  134   LNK        L1                = F1A(L1A,L1B);
141  135   FTN        F1A               = ADD,QUEUE(Q1,4);
142  136   MEM        Q1                = AREA(4);
143  137
144  138   LNK        L2A,L2B,L2C       = F2(L2);
145  139   FTN        F2                = CONVO(7);
146  140
147  141   LNK        L2                = F2A(L2A,L2B);
148  142   FTN        F2A               = ADD,QUEUE(Q2,4);
149  143   MEM        Q2                = AREA(4);
150  144
151  145   LNK        L3A,L3B,L3C       = F3(L3);
152  146   FTN        F3                = CONVO(7);
153  147
154  148   LNK        L3                = F3A(L3A,L3B);
155  149   FTN        F3A               = ADD,QUEUE(Q3,4);
156  150   MEM        Q3                = AREA(4);
157  151
158  152   LNK        L4A,L4B,L4C       = F4(L4);
159  153   FTN        F4                = CONVO(7);
160  154
161  155   LNK        L4                = F4A(L4A,L4B);
162  156   FTN        F4A               = ADD,QUEUE(Q4,4);
163  157   MEM        Q4                = AREA(4);
164  158
165  159   LNK        L5A,L5B,L5C       = F5(L5);
166  160   FTN        F5                = CONVO(7);
167  161
168  162   LNK        L5                = F5A(L5A,L5B);
169  163   FTN        F5A               = ADD,QUEUE(Q5,4);
170  164   MEM        Q5                = AREA(4);
171  165
172  166   LNK        L6A,L6B,L6C       = F6(L6);
173  167   FTN        F6                = CONVO(7);
174  168
175  169   LNK        L6                = F6A(L6A,L6B);
176  170   FTN        F6A               = ADD,QUEUE(Q6,4);
177  171   MEM        Q6                = AREA(4);
178  172
179  173   LNK        L7A,L7B,L7C       = F7(L7);
180  174   FTN        F7                = CONVO(7);
181  175
182  176   LNK        L7                = F7A(L7A,L7B);
183  177   FTN        F7A               = ADD,QUEUE(Q7,4);
184  178   MEM        Q7                = AREA(4);
185  179
186  180   ;          THE FOLLOWING ARE THE CMPING FOR THRESHOLDS
187  181
188  182   LNK        L1F,L1T           = FT1(L1C);
189  183   FTN        FT1               = CMP(GE,BRC),RDCYCS(T1,1);
190  184
191  185   LNK        L2F,L2T           = FT2(L2C);
192  186   FTN        FT2               = CMP(GE,BRC),RDCYCS(T2,1);
193  187
194  188   LNK        L3F,L3T           = FT3(L3C);
195  189   FTN        FT3               = CMP(GE,BRC),RDCYCS(T3,1);
196  190
197  191   LNK        L4F,L4T           = FT4(L4C);
198  192   FTN        FT4               = CMP(GE,BRC),RDCYCS(T4,1);
199  193
200  194   LNK        L5F,L5T           = FT5(L5C);
201  195   FTN        FT5               = CMP(GE,BRC),RDCYCS(T5,1);
202  196
203  197   LNK        L6F,L6T           = FT6(L6C);
204  198   FTN        FT6               = CMP(GE,BRC),RDCYCS(T6,1);
205  199
206  200   LNK        L7F,L7T           = FT7(L7C);
207  201   FTN        FT7               = CMP(GE,BRC),RDCYCS(T7,1);
208  202
209  203   ;          THE FOLLWING ARE THE RDCYCS ZEROS OR RDCYCS Dn BASED ON THRESHOLDS
```

```
210  204
211  205      MEM           ZERO               = 0;
212  206      ;-----------------------------------------------------
213  207      LNK           L_ACCUM                  = FT1F(L1T);
214  208      FTN           FT1F               = RDCYCS(ZERO,1);
215  209
216  210      LNK           L_ACCUM                  = FT1T(L1F);
217  211      FTN           FT1T               = RDCYCS(D0,1);
218  212      MEM           D0                 = 1;
219  213      ;-----------------------------------------------------
220  214      LNK           L_ACCUM                  = FT2F(L2T);
221  215      FTN           FT2F               = RDCYCS(ZERO,1);
222  216
223  217      LNK           L_ACCUM                  = FT2T(L2F);
224  218      FTN           FT2T               = RDCYCS(D1,1);
225  219      MEM           D1                 = 2;
226  220      ;-----------------------------------------------------
227  221      LNK           L_ACCUM                  = FT3F(L3T);
228  222      FTN           FT3F               = RDCYCS(ZERO,1);
229  223
230  224      LNK           L_ACCUM                  = FT3T(L3F);
231  225      FTN           FT3T               = RDCYCS(D2,1);
232  226      MEM           D2                 = 4;
233  227      ;-----------------------------------------------------
234  228      LNK           L_ACCUM                  = FT4F(L4T);
235  229      FTN           FT4F               = RDCYCS(ZERO,1);
236  230
237  231      LNK           L_ACCUM                  = FT4T(L4F);
238  232      FTN           FT4T               = RDCYCS(D3,1);
239  233      MEM           D3                 = 8;
240  234      ;-----------------------------------------------------
241  235      LNK           L_ACCUM                  = FT5F(L5T);
242  236      FTN           FT5F               = RDCYCS(ZERO,1);
243  237
244  238      LNK           L_ACCUM                  = FT5T(L5F);
245  239      FTN           FT5T               = RDCYCS(D4,1);
246  240      MEM           D4                 = 10H;
247  241      ;-----------------------------------------------------
248  242      LNK           L_ACCUM                  = FT6F(L6T);
249  243      FTN           FT6F               = RDCYCS(ZERO,1);
250  244
251  245      LNK           L_ACCUM                  = FT6T(L6F);
252  246      FTN           FT6T               = RDCYCS(D5,1);
253  247      MEM           D5                 = 20H;
254  248      ;-----------------------------------------------------
255  249      LNK           L_ACCUM                  = FT7F(L7T);
256  250      FTN           FT7F               = RDCYCS(ZERO,1);
257  251
258  252      LNK           L_ACCUM                  = FT7T(L7F);
259  253      FTN           FT7T               = RDCYCS(D6,1);
260  254      MEM           D6                 = 40H;
261  255      ;-----------------------------------------------------
262  256
263  257      ;         THE FOLLOWING SUCCESIVELY ADDS (ACCUMULATES) THRESHOLD RESULTS
264  258
265  259      LNK           L_ANS              = F_ACCUM(L_ACCUM);
266  260      FTN           F_ACCUM                  = ACC,COUNT(7);
267  261
268  262      ;-----------------------------------------------------
269  263
270  264      ;         OUTPUT THE ANSWER TO THE HOST
271  265
272  266      LNK           ASCII_OUT          = F_OUT(L_ANS);
273  267      FTN           F_OUT              = OUT1(HOSTMN,HOSTID);
274  268      OUTPUT                           ASCII_OUT;
275  269
276  270      ;-----------------------------------------------------
277  271
278  272      START;
279  273
280  274      DATA          EXEC               (PGMMN,L_IN,0001);
281  275      DATA          EXEC               (PGMMN,L_IN,0002);
282  276      DATA          EXEC               (PGMMN,L_IN,0003);
283  277      DATA          EXEC               (PGMMN,L_IN,0004);
284  278
285  279      END;

** DM    SECTION **

LOC.   OBJECT        LABEL      MNEMONIC

0040                            ORG        0040H
     0040                            DC         0000H
     0042                            ORG        0042H
     0042                 Q1       : DS         0004H
```

```
0046              Q2      : DS      0004H
004A              Q3      : DS      0004H
004E              Q4      : DS      0004H
0052              Q5      : DS      0004H
0056              Q6      : DS      0004H
005A              Q_IN    : DS      0004H
005E              Q7      : DS      0004H
0062              W1      : DS      0004H
0066              W2      : DS      0004H
006A              W3      : DS      0004H
006E              W4      : DS      0004H
0072              W5      : DS      0004H
0076              W6      : DS      0004H
007A              W7      : DS      0004H
007E              ZERO    : DC      0000H
0080                        ORG    0080H
0080              T1      : DS      0001H
0082                        ORG    0082H
0082              T2      : DS      0001H
0084                        ORG    0084H
0084              T3      : DS      0001H
0086                        ORG    0086H
0086              T4      : DS      0001H
0088                        ORG    0088H
0088              T5      : DS      0001H
008A                        ORG    008AH
008A              T6      : DS      0001H
008C                        ORG    008CH
008C              T7      : DS      0001H
008E                        ORG    008EH
008E              D0      : DC      0001H
0090                        ORG    0090H
0090              D1      : DC      0002H
0092                        ORG    0092H
0092              D2      : DC      0004H
0094                        ORG    0094H
0094              D3      : DC      0008H
0096                        ORG    0096H
0096              D4      : DC      0010H
0098                        ORG    0098H
0098              D5      : DC      0020H
009A                        ORG    009AH
009A              D6      : DC      0040H

** DM    76 WORDS USED **

** LT   SECTION **

LOC.   OBJECT      LABEL      MNEMONIC 0000    4DC3       L_IN     : AG&FC    L_Q     , F_INQ   , 0
0001    3403       L_T1     : AG&FC    L_IN    , F_T1    , 0
0002    3C03       L_T2     : AG&FC    L_IN    , F_T2    , 0
0003    4403       L_T3     : AG&FC    L_IN    , F_T3    , 0
0004    5403       L_T4     : AG&FC    L_IN    , F_T4    , 0
0005    6403       L_T5     : AG&FC    L_IN    , F_T5    , 0
0006    7003       L_T6     : AG&FC    L_IN    , F_T6    , 0
0007    7C03       L_T7     : AG&FC    L_IN    , F_T7    , 0
0008    5003       L_W1     : AG&FC    L_IN    , F_W1    , 0
0009    6003       L_W2     : AG&FC    L_IN    , F_W2    , 0
000A    6C03       L_W3     : AG&FC    L_IN    , F_W3    , 0
000B    7803       L_W4     : AG&FC    L_IN    , F_W4    , 0
000C    8803       L_W5     : AG&FC    L_IN    , F_W5    , 0
000D    9003       L_W6     : AG&FC    L_IN    , F_W6    , 0
000E    9803       L_W7     : AG&FC    L_IN    , F_W7    , 0
000F    C5D9       L3A      : PU       L3      , F3A     , 0
0010    C5DD       L3B      : PU       L3      , F3A     , 1
0011    4941       L3C      : PU       L3F     , FT3     , 0
0012    BDD1       L2A      : PU       L2      , F2A     , 0
0013    BDD5       L2B      : PU       L2      , F2A     , 1
0014    4131       L2C      : PU       L2F     , FT2     , 0
0015    B5C9       L1A      : PU       L1      , F1A     , 0
0016    B5CD       L1B      : PU       L1      , F1A     , 1
0017    3921       L1C      : PU       L1F     , FT1     , 0
0018    CD91       L4A      : PU       L4      , F4A     , 0
0019    CD95       L4B      : PU       L4      , F4A     , 1
001A    5D51       L4C      : PU       L4F     , FT4     , 0
001B    D599       L5A      : PU       L5      , F5A     , 0
001C    D59D       L5B      : PU       L5      , F5A     , 1
001D    6961       L5C      : PU       L5F     , FT5     , 0
001E    DDA1       L6A      : PU       L6      , F6A     , 0
001F    DDA5       L6B      : PU       L6      , F6A     , 1
0020    7571       L6C      : PU       L6F     , FT6     , 0
0021    E1A9       L7A      : PU       L7      , F7A     , 0
0022    E1AD       L7B      : PU       L7      , F7A     , 1
0023    8581       L7C      : PU       L7F     , FT7     , 0
0024    E5BB       L1F      : AG&FC    L_ACCUM , FT1T    , 0
```

```
0025  81BB              L1T     : AG&FC   L_ACCUM  , FT1F    ,  0
0026  01BB              L2F     : AG&FC   L_ACCUM  , FT2T    ,  0
0027  8DBB              L2T     : AG&FC   L_ACCUM  , FT2F    ,  0
0028  05BB              L3F     : AG&FC   L_ACCUM  , FT3T    ,  0
0029  95BB              L3T     : AG&FC   L_ACCUM  , FT3F    ,  0
002A  09BB              L4F     : AG&FC   L_ACCUM  , FT4T    ,  0
002B  9DBB              L4T     : AG&FC   L_ACCUM  , FT4F    ,  0
002C  0DBB              L5F     : AG&FC   L_ACCUM  , FT5T    ,  0
002D  A1BB              L5T     : AG&FC   L_ACCUM  , FT5F    ,  0
002E  15BB              L6F     : AG&FC   L_ACCUM  , FT6T    ,  0
002F  A5BB              L6T     : AG&FC   L_ACCUM  , FT6F    ,  0
0030  1DBB              L7F     : AG&FC   L_ACCUM  , FT7T    ,  0
0031  A9BB              L7T     : AG&FC   L_ACCUM  , FT7F    ,  0
0032  C0C3              L4      : AG&FC   L4A      , F4      ,  0
0033  C8DB              L5      : AG&FC   L5A      , F5      ,  0
0034  D0F3              L6      : AG&FC   L6A      , F6      ,  0
0035  D90B              L7      : AG&FC   L7A      , F7      ,  0
0036  0400              L_ANS   : OUT     ASCII_OU , F_OUT   ,  0
0037  59B1              L_ACCUM : PU      L_ANS    , F_ACCUM ,  0
0038  0202              L_Q     : GE      L_C1     , F_INCOPY,  0
0039  ACAB              L1      : AG&FC   L1A      , F1      ,  0
003A  B093              L2      : AG&FC   L2A      , F2      ,  0
003B  B87B              L3      : AG&FC   L3A      , F3      ,  0
0040                            ORG      0040H
0040  11CB              L_C1    : AG&FC   L1       , F_M1    ,  0
0041  19D3              L_C2    : AG&FC   L2       , F_M2    ,  0
0042  21DB              L_C3    : AG&FC   L3       , F_M3    ,  0
0043  2593              L_C4    : AG&FC   L4       , F_M4    ,  0
0044  299B              L_C5    : AG&FC   L5       , F_M5    ,  0
0045  2DA3              L_C6    : AG&FC   L6       , F_M6    ,  0
0046  31AB              L_C7    : AG&FC   L7       , F_M7    ,  0
0047  4DC7              L_REG   : AG&FC   L_Q      , F_INQ   ,  1

** LT   68 WORDS USED **

** FT   SECTION **

LOC.  OBJECT            LABEL    MNEMONIC 0000  0580              F_INCOPY: COPYM    0008H
0000  0480 0000         FT2T    : RDCYCS   D1       ,0001H
0001  0490 0000         FT3T    : RDCYCS   D2       ,0001H
0001                            ORG      0001H
0001  0000              F_OUT   : OUT1     0,0000H
0002  04A0 0000         FT4T    : RDCYCS   D3       ,0001H
0003  04B0 0000         FT5T    : RDCYCS   D4       ,0001H
0004  0313 0000         F_M1    : RDCYCS   W1       ,0004H
0005  04C0 0000         FT6T    : RDCYCS   D5       ,0001H
0006  0333 0000         F_M2    : RDCYCS   W2       ,0004H
0007  04D0 0000         FT7T    : RDCYCS   D6       ,0001H
0008  0353 0000         F_M3    : RDCYCS   W3       ,0004H
0009  0373 0000         F_M4    : RDCYCS   W4       ,0004H
000A  0393 0000         F_M5    : RDCYCS   W5       ,0004H
000B  03B3 0000         F_M6    : RDCYCS   W6       ,0004H
000C  03D3 0000         F_M7    : RDCYCS   W7       ,0004H
000D  1400 0000         F_T1    : WRCYCS   T1       ,0001H
000E  22A9              FT1     : CMP      BRC,GE   ,FULL
      0400 0000                  RDCYCS   T1       ,0001H
000F  1410 0000         F_T2    : WRCYCS   T2       ,0001H
0010  22A9              FT2     : CMP      BRC,GE   ,FULL
      0410 0000                  RDCYCS   T2       ,0001H
0011  1420 0000         F_T3    : WRCYCS   T3       ,0001H
0012  22A9              FT3     : CMP      BRC,GE   ,FULL
      0420 0000                  RDCYCS   T3       ,0001H
0013  32D3 0301         F_INQ   : QUEUE    Q_IN     ,0004H
0014  1313 0000         F_W1    : WRCYCS   W1       ,0004H
0015  1430 0000         F_T4    : WRCYCS   T4       ,0001H
0016  2212              F_ACCUM : ACC      FULL
      D006 0000                  COUNT    0007H
0017  22A9              FT4     : CMP      BRC,GE   ,FULL
      0430 0000                  RDCYCS   T4       ,0001H
0018  1333 0000         F_W2    : WRCYCS   W2       ,0004H
0019  1440 0000         F_T5    : WRCYCS   T5       ,0001H
001A  22A9              FT5     : CMP      BRC,GE   ,FULL
      0440 0000                  RDCYCS   T5       ,0001H
001B  1353 0000         F_W3    : WRCYCS   W3       ,0004H
001C  1450 0000         F_T6    : WRCYCS   T6       ,0001H
001D  22A9              FT6     : CMP      BRC,GE   ,FULL
      0450 0000                  RDCYCS   T6       ,0001H
001E  1373 0000         F_W4    : WRCYCS   W4       ,0004H
001F  1460 0000         F_T7    : WRCYCS   T7       ,0001H
0020  03F0 0000         FT1F    : RDCYCS   ZERO     ,0001H
0021  22A9              FT7     : CMP      BRC,GE   ,FULL
      0460 0000                  RDCYCS   T7       ,0001H
0022  1393 0000         F_W5    : WRCYCS   W5       ,0004H
0023  03F0 0000         FT2F    : RDCYCS   ZERO     ,0001H
0024  13B3 0000         F_W6    : WRCYCS   W6       ,0004H
0025  03F0 0000         FT3F    : RDCYCS   ZERO     ,0001H
```

```
0026    13D3 0000    F_W7    : WRCYCS    W7     ,0004H
0027    03F0 0000    FT4F    : RDCYCS    ZERO   ,0001H
0028    03F0 0000    FT5F    : RDCYCS    ZERO   ,0001H
0029    03F0 0000    FT6F    : RDCYCS    ZERO   ,0001H
002A    03F0 0000    FT7F    : RDCYCS    ZERO   ,0001H
002B    F006 0000    F1      : CONVO     0007H
002C    F006 0000    F2      : CONVO     0007H
002D    2018         F1A     : ADD       FULL
        3213 0000                QUEUE   Q1     ,0004H
002E    F006 0000    F3      : CONVO     0007H
002F    2018         F2A     : ADD       FULL
        3233 0000                QUEUE   Q2     ,0004H
0030    F006 0000    F4      : CONVO     0007H
0031    2018         F3A     : ADD       FULL
        3253 0000                QUEUE   Q3     ,0004H
0032    F006 0000    F5      : CONVO     0007H
0033    2018         F4A     : ADD       FULL
        3273 0000                QUEUE   Q4     ,0004H
0034    F006 0000    F6      : CONVO     0007H
0035    2018         F5A     : ADD       FULL
        3293 0000                QUEUE   Q5     ,0004H
0036    F006 0000    F7      : CONVO     0007H
0037    2018         F6A     : ADD       FULL
        32B3 0000                QUEUE   Q6     ,0004H
0038    2018         F7A     : ADD       FULL
        32F3 0000                QUEUE   Q7     ,0004H
0039    0470 0000    FT1T    : RDCYCS    D0     ,0001H

** FTL   17 WORDS USED **
** FTR   58 WORDS USED **
** FTT   58 WORDS USED **

OBJECT CODE LIST ( MNEMONIC )       MODULE NAME             NO.

** DATA SECTION **

LOC.    OBJECT       LABEL   MNEMONIC

----    B0000001             EXEC       L_IN   ,0001H
----    B0000002             EXEC       L_IN   ,0002H
----    B0000003             EXEC       L_IN   ,0003H
----    B0000004             EXEC       L_IN   ,0004H

ASSEMBLY COMPLETE,    0 ERROR(S),    0 WARNING(S) FOUND
```

I claim:

1. A device for performing pattern recognition comprising:
   a data flow processor;
   input means for inputting a set of data tokens into said data flow processor, each data token containing a data value;
   copy means, within said data flow processor, linked to said input means receiving said set of data tokens for making multiple copies of said set of data tokens;
   a plurality of weighting means, within said data flow processor, each linked to said copy means and receiving a copy of said set of data tokens for associating a predetermined weight value to each data value of said set of data tokens and for generating a weighted product of each of said data values with said predetermined weight value associated with each of said data values; and
   a plurality of neuron means, within said data flow processor, each linked to one of said weighting means receiving therefrom said weighted products provided, for generating a sum of said weighted products by summing said weighted products, for determining within said data flow processor a first output value whenever said sum is greater than or equal to a predetermined threshold value, and for determining within said data flow processor a second output value whenever said sum is less than said predetermined threshold value, wherein each of said plurality of neuron means comprises means for receiving said weighted products;
   summing means for receiving two values and for generating a partial sum, which is a sum of said two values, by summing said two values;
   queue means receiving said partial sum and said weighted products for holding said partial sum and said weighted products received and for passing a first value and a second value to a summing means, said first value and said second value corresponding to the earliest two values held by the queue means;
   convolving means for outputting a predetermined queue means element corresponding to a full neural sum;
   comparing means receiving said full neural sum for reading said predetermined threshold value from a storage location and for generating a predetermined third output value based on the arithmetic difference between said full neural sum and said predetermined threshold value.

2. The device of claim 1 wherein said comparing means outputs an integer power of 2 whenever said full neural sum is greater than or equal to said predetermined threshold value, said comparing means outputting 0 whenever said full neural sum is less than said predetermined threshold value.

3. The device of claim 2 further comprising:
   an accumulating means, operatively coupled to said plurality of neuron means, receiving said first and second output values from said plurality of neuron means for generating a sum of said first output values and said second output values received.

4. The device of claims 1, 2 or 3 wherein said data flow processor is a NEC μPD7281 data flow processor.

* * * * *